United States Patent Office 3,361,713
Patented Jan. 2, 1968

3,361,713
STABILITY OF POLYOLEFINES
Gerhard Meyer, Obernburg, Erhard Siggel, Seckmauern uber Hochst, Odenwald, Albert Schöpf, Hering uber Hochst, Odenwald, and Helmut Mägerlein, Erlenbach, Germany, assignors to Vereinigte Glanzstoff-Fabriken AG., Wuppertal-Elberfeld, Germany
No Drawing. Filed Jan. 26, 1965, Ser. No. 428,230
Claims priority, application Germany, Jan. 31, 1964,
V 25,289
20 Claims. (Cl. 260—45.85)

ABSTRACT OF THE DISCLOSURE

Stabilizing a high molecular weight poly-α-monoolefine such as polypropylene against oxidation by treating it in finely divided form dispersed in an inert hydrocarbon liquid containing a small amount, e.g. 0.01 to 1% by weight with reference to the poly-α-monoolefine, of a mercaptan or mercaptan acid ester under agitation and in the presence of a free radical initiator such as UV-rays or an organic peroxide, e.g. di-tert.-butyl-peroxide or dibenzoyl peroxide, at temperatures of 20–120° C. and for a period of one-half hour to five hours, and then separating the poly-α-monoolefine from the liquid medium. Examples of mercaptan compounds are stearyl mercaptan, amyl mercaptoacetate, thiophenol and benzyl mercaptan. The resulting stabilized poly-α-monoolefine is useful for producing filaments, films and molded articles resistant to oxidation.

---

This invention is concerned with a process for treatment of high molecular weight polyolefines so as to improve their stability against oxidation. More particularly, the invention relates to a method of contacting a polyolefine with a specific treating agent under conditions which are sufficient to enhance the oxidation-resistance of the resulting polyolefine product.

It is known that valuable products in the form of filaments, films, foils or other extruded or molded articles can be produced from polyolefines obtained by the addition polymerization of monomeric olefines, such as the alpha-monoolefines of from 2 up to about 10 carbon atoms. Especially favorable properties are exhibited by solid high molecular weight polyolefines which have been obtained by the so-called low pressure polymerization process requiring the use of a stereospecific catalyst or the so-called Ziegler catalysts. Although such polyolefines have advantageous properties such as high strength, high density, relatively higher melting points and general resistance to chemical attack, they exhibit a somewhat limited stability against attack by oxygen, especially where there is simultaneous application of heat and/or exposure to ultraviolet rays. The damage shown by polyolefines under such oxidation conditions has been attributed to the presence of double bonds in or on the molecular chain of the polymer, these double bonds or olefinically unsaturated portions of the molecule being particularly susceptible to attack by oxygen. It does not appear to be possible to prevent or avoid the occurrence of these double bonds by an special precautions during polymerization. Therefore, in order to improve the stability of the polyolefine, it is apparently necessary to subject the polymer to an after-treatment which will tend to saturate the double bonds.

For example, it has been suggested that the polymer be subjected to a treatment with certain silicon compounds in which at least one hydrogen atom is attached directly to the silicon atom. In this known process, the polyolefine must be dissolved in a solvent and stirred for a relatively long period of time together with the silicon compound and a suitable catalyst. Aside from the fact that this process requires the use of considerable amounts of solvents and precipitation agents, it is unusually expensive because a thorough purification must be carried out after the treatment with the silicon compound and precipitation of the treated polymer from its solution.

According to an alternative of this known process, the stabilizing treatment can also be carried out by mixing the polyolefine with the silicon compound in an extruder at elevated temperatures, e.g. 250–300° C. However, a uniform stabilization is not obtained in this manner. Furthermore, this process suffers from the disadvantage that the silicon compound remains in the polymer.

In another known process, hydrogenation of the double bonds has been attempted in order to solve the problem of stabilization. The polyolefine in the form of a solution, emulsion or suspension is conducted through a suitable hydrogenation reaction vessel where it is brought into contact with a specific hydrogenation catalyst. This process requires a considerable expenditure in apparatus and time and is not suitable for treating large amounts of polyolefines. Finally, this method is disadvantageous in that the treated polyolefine must be subjected to additional steps for removal of the heterogeneous hydrogenation catalyst which would otherwise cause trouble in the normal processing of the polyolefine into finished articles.

The primary object of the present invention is to provide a process of treating a polyolefine which will lead to an improved product exhibiting better resistance to oxidation and aging, especially such oxidation as may occur in normal use of the polymer where it is exposed to heat and light.

Another object of the invention is to improve the stability of polyolefines against oxidation by a process or method which can be carried out in an economical manner and under easily controlled conditions.

Yet another object of the invention is to provide a process for improving the stability of polyolefines whereby conventional apparatus can be employed and the necessary steps can be readily combined with conventional polymerization processes for the production and separation of a substantially pure polyolefine.

Still another object is to improve the polyolefine stability by a process which permits the treatment of large quantities of the polymer on a commercial scale.

These and other objects and advantages of the invention will become more apparent after considering the following detailed specification.

It has now been found in accordance with the present invention, that an improved polyolefine product can be obtained by dispersing the polyolefine as a finely divided powder in an inert hydrocarbon liquid containing a small amount of an organic sulfur compound selected from the group consisting of mercaptans and mercaptan acid esters and heating this dispersion with mixing or agitation at a temperature of about room temperature up to the boiling point of the inert hydrocarbon liquid, in the presence of a free radical initiator and for a period of time sufficient to enhance the oxidation-resistance of the polyolefine. The polyolefine is then separated from the dispersion, for example by filtration, and is then preferably washed two or more times with the inert hydrocarbon liquid and finally dried by evaporation or distilling off any adherent hydrocarbon liquid.

The process of the present invention is particularly advantageous for the treatment of poly-alpha-monoolefines of from 2 up to about 8 carbon atoms in the monomeric alpha-monoolefine, and especially good results have been achieved with the treatment of the polyolefines of the 3 to 6 carbon atom monomers, e.g. polypropylene, polybutylene or poly-4-methyl-pentene-1. The results are also quite significant where the treatment is applied to stereoregulated or isotactic polyolefines as obtained by polymerization of the olefine under low pressure conditions in the presence of particular catalyst systems commonly referred to as stereospecific catalysts. These catalyst systems are well known in this art as well as the polymerization conditions and methods of recovering the isotactic polymer product. The preferred Ziegler catalyst contains $TiCl_3$ in combination with a trialkyl aluminum, e.g. triethyl aluminum.

The process of the invention is most conveniently carried out after the polyolefine has been purified, i.e. after polymerization has taken place and the polymer has been purified by removing and recovering the catalyst components therefrom. In the case of Ziegler type catalysts which are acid-soluble, the polymerization product is extracted with alcoholic-HCl, e.g. weak HCl in methanol, and the polymer is then washed and/or neutralized for substantially complete removal of the extractant and catalyst components. At this point, the purified polyolefine is in the form of a finely divided powder which can be readily subjected to the stabilizing treatment of the invention. Furthermore, the preceding steps are carried out in conventional apparatus with the substantial exclusion of oxygen and water, and the purified polyolefine can then be treated in the same apparatus under the same conditions of an oxygen-free and moisture-free environment, thereby avoiding any procedural complications in the overall process.

The purified polyolefine powder is normally obtained in conventional polymerization processes in a particle size which is quite suitable for the stabilizing treatment of the invention within a reasonable period of time. Smaller particles can usually be treated at lower temperatures and/or shorter periods of time. In general, it is desirable to use particle sizes of about $0.1\mu$ to $500\mu$.

The organic sulfur compound employed as the treating agent can be added to the inert hydrocarbon liquid in small amounts of at least 0.01% and preferably about 0.1 to 1% by weight, with reference to the total amount of the polyolefine. Somewhat higher amounts of the organic sulfur compound, e.g. up to 2% or even 5% by weight (with reference to the polyolefine), can also be employed but without any special advantage.

Suitable organic sulfur compounds of 2 to 21 carbon atoms and preferably 6 to 18 carbon atoms include the mercaptans in which a sulfhydryl radical is attached to a hydrocarbon according to the formula R—SH wherein R is preferably a saturated hydrocarbon radical such as alkyl of 2 to 18 carbon atoms, cycloalkyl of 5 to 8 carbon atoms, aryl such as phenyl or naphthyl, or aralkyl such as benzyl. It is also possible to use the mercaptan acid esters in which the sulfhydryl group is attached to the acid portion of the ester according to the formula $$HS—R_1COOR_2$$

wherein $R_1$ and $R_2$ represent hydrocarbon radicals of one or more carbon atoms such that the compound has a total of at least 3 and preferably at least 6 up to not more than 21 carbon atoms. The mercaptan alkanoic acid alkyl esters are preferred wherein $R_1$ is alkylene and $R_2$ is alkyl with the sulfhydryl group preferably in the $\alpha$- or $\beta$-position in the acid portion of the compound. $R_1$ is preferably lower alkylene such as methylene or ethylene while $R_2$ is preferably a longer chain alkyl such as lauryl or octadecyl, although variations in the chain length of each radical is permissible.

While lower boiling organic sulfur compounds such as ethyl or butyl mercaptan can be employed, they have a disagreeable odor so that it is more practical to employ higher boiling compounds, e.g. with boiling points above 100° C. and preferably above 150° C., such as stearyl mercaptan [$CH_3(CH_2)_{16}CH_2SH$], lauryl mercaptan

[$CH_3(CH_2)_{10}CH_2SH$]

or cetyl mercaptan [$CH_3(CH_2)_{14}CH_2SH$] or the corresponding higher molecular weight mercaptan acid esters such as the amyl, lauryl or cetyl esters of mercaptoacetic acid or $\beta$-mercaptopropionic acid.

Specific mercaptans and mercaptan acid esters include the following: butyl mercaptan, hexyl mercaptan, decyl mercaptan, lauryl mercaptan, cetyl mercaptan, stearyl mercaptan, cyclohexyl mercaptan, thiophenol, benzyl mercaptan, lauryl mercaptoacetate, lauryl-$\beta$-mercaptopropionate, amyl mercaptoacetate, pentyl mercaptan, heptyl mercaptan, octyl mercaptan, nonyl mercaptan, undecyl mercaptan, thiocresol, ethyl mercaptoacetate, propyl mercaptoacetate, butyl mercaptoacetate, hexyl mercaptoacetate, heptyl mercaptoacetate, octyl mercaptoacetate, nonyl mercaptoacetate, decyl mercaptoacetate, stearyl mercaptoacetate and the corresponding $\beta$-mercaptopropionates.

When carrying out the treatment of the invention with an organic peroxide as the catalyst or free radical initiator, the peroxide can be used in quite small amounts of at least 0.001% and preferably 0.01 to 0.1% by weight, with reference to the polyolefine. Somewhat larger amounts of the peroxide, e.g. up to 1% by weight with reference to the polyolefine, can also be used, but larger amounts of the peroxide should generally be avoided. The treatment with the peroxide should be carried out at a temperature of at least about 40° C. up to the boiling point of the dispersing agent, and preferably at temperatures of about 60° C. to 120° C. The treatment with the peroxide initiator can usually be accomplished within a period of about 20 minutes to 7 hours, preferably about 30 minutes to 5 hours.

The preferred organic peroxides are as follows: dialkyl-peroxides such as di-tert.-butylperoxide, diacylperoxides such as dibenzoyl peroxide, diacetyl peroxide or dilauroyl peroxide; ketone peroxides, such as cyclohexanone peroxide or methylethylketone peroxide; and other peroxides such as dicumyl peroxide, tert.-butylperacetate or tert.-butylperbenzoate. Still other suitable organic peroxides include the following: di-t-amyl peroxide, 2,2-bis-(t-butylperoxide)butane, cumene hydroperoxide, t-butyl hydroperoxide, cyclohexyl hydroperoxide, methylcyclohexyl hydroperoxide, p-menthane hydroperoxide, methylamylketone peroxide, acetylbenzoyl peroxide, disuccinyl peroxide, 2,4-dichlorobenzoyl peroxide, dicaproyl peroxide, di-t-butyl perphthalate, t-butyl permaleic acid, isopropyl percarbonate, peracetic acid, dibutyryl peroxide, hydroxyheptyl peroxide, 1-hydroxycyclohexyl hydroperoxide-1, dibenzaldiperoxide.

As the free radical initiator, it is also possible to use ultraviolet irradiation, e.g. by the intermittent application of UV-rays from a mercury lamp immersed in the liquid treating medium. In using such ultraviolet radiation, it is not necessary to co-employ an organic peroxide or other free radical initiator and the treatment can be carried out at relatively lower temperatures and shorter treatment periods. For example, the treatment can be carried out at about room temperature up to the boiling point of the dispersing agent, and preferably at about 20° C. to 40° C. In general, the treatment can be carried out for a period of about 20 minutes up to 2 hours and preferably about 30 minutes to 1 hour.

As the inert dispersing agent, it is possible to use any liquid hydrocarbon such as penane, hexane, heptane, benzine, benzene, toluene, xylene, decalin, tetralin, diesel oil or the like. Of course, it is also possible to use mixtures of these inert hydrocarbons or to use a different hydrocarbon for washing than is used during the treatment itself, but it is generally more convenient to use just one hydrocarbon for all of the process steps.

It is preferable to employ a hydrocarbon as the dispersing agent which is easily volatilized because it is then much easier to separate and recover the hydrocarbon liquid after the stabilizing treatment is completed. For example, hydrocarbons with boiling points below about 100° C. are especially useful.

The temperatures and periods of time for any specific treatment obviously depend on a number of different factors. Thus, under suitable conditions, it is possible to work at temperatures which lie higher than the normal boiling point of the dispersing agent, i.e. the boiling point at atmospheric pressure. In these cases, the pressure must be correspondingly increased, for example by working in a closed vessel where the pressure is determined by the temperature of the liquid hydrocarbon employed as the dispersing agent.

When employing ultraviolet irradiation by means of a mercury lamp immersed in the liquid medium, sufficient heat is developed by the lamp so that it may be necessary to apply external cooling, especially if the treatment is carried out at about room temperature. In this respect, the term "heating" is employed herein with the meaning that the liquid medium is maintained at a substantially constant temperature, even if some cooling is required.

By comparison with known stabilizing methods, the process of the present invention offers the advantage that it can be carried out directly in conjunction with the purification of the polymer without interfering with the normal polymerization or the separation and recovery of the polymerization catalyst and purified polymer. The hydrocarbons which are suitable as dispersing agents for the stabilizing process are also solvents which have been found to be useful in the preceding purification process. The excess dispersing agent can be separated by filtration or centrifuging, and the polymer is easily purified to remove substantially all of the treating agent by a simple washing with the inert hydrocarbon liquid. Thus, it is possible to avoid a special purification as is required in known methods which use a heterogeneous catalyst for the stabilizing treatment. A much more uniform and extensive stabilization is obtained by contacting the polyolefine powder with the organic sulfur compounds contained in the dispersing agent under the conditions of the invention than is possible by incorporating or engraining a stabilizing agent into the polymer.

The process of the invention is further illustrated but not limited by the following examples:

Examples 1–13

A polyolefine powder consisting of either polypropylene or poly-4-methylpentene-1 was treated in a number of different experiments as shown in the table below. The initial polyolefine was first obtained by polymerization of propylene or 4-methylpentene-1 in the presence of triethyl aluminum and $TiCl_3$ as a stereospecific catalyst. After completion of the polymerization, the polyolefine powder was purified with hexane and with methanol in admixture with hydrochloric acid, washed neutral and then dried. In treating this purified polyolefine, two different procedures were followed depending upon the particular free radical initiator being employed.

(A) *Procedure followed with an organic peroxide.*—Into a 1-liter two-necked flask equipped with an agitator and a reflux condenser, 100 grams of the polyolefine were introduced into 600 ml. of the dispersing agent under a nitrogen atmosphere. To this dispersion, there were then added to the organic sulfur compound as a treating agent as well as the organic peroxide. The dispersion was then heated with mixing under the conditions shown in the table. The dispersing agent was then filtered off, the polymer powder washed twice, each time with 100 ml. of the dispersing agent, and then dried under a nitrogen atmosphere in a vacuum drying chamber. The stability of the dry product was then measured.

(B) *Procedure followed with UV-irradiation.*—Into a 1-liter two-necked flask equipped with an agitator and a mercury immersion lamp (70 watt), 100 grams of the polyolefine were dispersed in 600 ml. of the hydrocarbon dispersing agent under a nitrogen atmosphere, and the organic sulfur compound was then added as a treating agent to the dispersion. Mixing was then begun and the UV-lamp turned on. The flask was externally cooled with water in order to counteract the heat developed by the lamp. To prevent an undesirable decomposition of the polymer, the lamp was turned on for only the first two minutes of each five minute period throughout the entire treatment. At the end of the treatment, the polymer powder was separated by filtration, washed twice with 100 ml. of the dispersing agent each time, and then dried under nitrogen. The stability of the dried product was then measured.

TABLE

| Ex. No. | Mercaptan additive | Percent by weight [1] | Peroxide | Percent by weight [1] | UV-light | Treatment time, hrs. | Temp., °C. | Dispersing Stability Agent | Dispersing Stability Minutes |
|---|---|---|---|---|---|---|---|---|---|
| 1 | Stearyl mercaptan | 1 | Dibenzoyl-peroxide | 0.1 | — | 4 | 98 | Heptane | 92 |
| 2 | Mercaptoacetic acid-amyl ester | 1 | do | 0.1 | — | 4 | 98 | do | 100 |
| 3 | do | 1 | | | + | 1 | 20 | do | 100 |
| 4 | β-Mercaptopropionic acid-lauryl ester | 1 | Dibenzoyl-peroxide | 0.1 | — | 4 | 98 | do | 82 |
| 5 | do | 1 | | | + | 1 | 20 | do | 95 |
| 6 | Thiophenol | 0.5 | Dicumylperoxide | 0.05 | — | 3 | 60 | Hexane | 75 |
| 7 | Benzyl mercaptan | 0.75 | Di-tert.-butyl-peroxide | 0.075 | — | 4 | 80 | Benzene | 85 |
| 8 | do | 0.75 | | | + | 1 | 80 | do | 90 |
| 9 | | | | | + | 1 | 20 | Heptane | 56 |
| 10 | | | Dibenzoyl-peroxide | 0.1 | — | 4 | 98 | do | 47 |
| 11 | Stearyl mercaptan | 1 | Di-tert.-butyl-peroxide | 0.1 | — | 4 | 98 | do | 10 |
| 12 | do | 1 | | | + | 1 | 98 | do | 12 |
| 13 | | | Di-tert.-butyl-peroxide | 0.1 | — | 4 | 98 | do | 3 |

[1] Percent by weight, in each instance, with reference to the total amount of the polyolefine.

Examples 1–10 of the above table refer to the treatment of polypropylene whereas Examples 11–13 are concerned with the treatment of poly-4-methylpentene-1. Examples 9, 10 and 13 are control experiments in which the mercaptan or mercaptan acid ester were omitted.

For determination of the stability of the treated polyolefine in the foregoing examples, 30 grams of the polymer powder were ground in a ball mill for a period of 30 minutes with a stabilizing mixture of 0.03 gram dilauryl-thiodipropionate and 0.03 gram of 4,4'-thio-bis-(3-methyl-6-t-butyl-phenol), i.e. 0.1% by weight in each case. 12 grams of this mixture were pressed in a plate press at 170° C. and under a pressure of 350 atm. into a 1 mm.

thick plate. The plate was cut into strips 3–4 mm. wide and 30–40 mm. long from which 3 grams were introduced into a test tube standing in an aluminum block maintained at 200 ±1.5° C. and connected to an oxygen burette. By controlling the volume of oxygen, the time in minutes was determined for the spontaneous absorption of oxygen to begin. This induction period for the oxidation of the polymer at 200° C. in pure oxygen serves as a measure of the stability at room temperature. In the case of poly-4-methylpentene-(1), the measurement was carried out at 230° C. and the oxygen was introduced into the stabilized, unpressed powder contained in the test tube. Similar results can be achieved under conditions corresponding to the preceding examples by treating the polyolefine with organic sulphur compounds such as butyl mercaptan, pentyl mercaptan, hexyl mercaptan, heptyl mercaptan, octyl mercaptan, nonyl mercaptan, decyl mercaptan, undecyl mercaptan, lauryl mercaptan, cetyl mercaptan, cyclohexyl mercaptan, thiocresol, ethyl mercaptoacetate, propyl mercaptoacetate, butyl mercaptoacetate, hexyl mercaptoacetate, heptyl mercaptoacetate, octyl mercaptoacetate, nonyl mercaptoacetate, decyl mercapto acetate, stearyl mercaptoacetate, and the corresponding mercaptopropionates either under ultraviolet radiation or with other peroxides such as di- t-amyl-peroxide, 2,2-bis-(t-coutylperoxide)-butane, cumene hydroperoxide, t-butyl hydroperoxide, cyclohexyl hydroperoxide, methylcyclohexyl hydroperoxide, p-menthane hydroperoxide, methylamylketone peroxide, diacetyl peroxide, acetyl benzoyl peroxide, dilauroyl peroxide, disuccinyl peroxide, 2,4-dichlorobenzoyl peroxide, dicaproyl peroxide, t-butyl perbenzoate, di-t-butyl perphthalate, t-butyl permaleic acid isopropyl percarbonate, peracetic acid, dibutyryl peroxide, t-butyl peracetate, hydroxyheptyl peroxide, 1-hydroxycyclohexyl hydroperoxide 1-dibenzaldiperoxide.

The invention is hereby claimed as follows:

1. A process for improving the stability of a high molecular weight poly-α-monoolefine which comprises: dispersing said poly-α-monoolefine as a finely divided powder in an inert hydrocarbon liquid containing 0.01 to 5% with reference to the poly-α-monoolefine of an organic sulfur compound having the formula R—SH wherein R represents a member selected from the group consisting of a hydrocarbon radical of 2 to 21 carbon atoms and the radical of the formula $R_2OOC-R_1-$ in which $R_1$ and $R_2$ each represent a saturated hydrocarbon radical such that the resulting ester has a total of 3 to 21 carbon atoms, heating said dispersion with agitation at a temperature of about room temperature up to the boiling point of the inert hydrocarbon liquid, under a substantially oxygen-free atmosphere, in the presence of a free radical initiator selected from the class consisting of UV-rays and organic peroxides and for a period of time sufficient to enhance the oxidation-resistance of the poly-α-monoolefine; and separating the poly-α-monoolefine from the dispersion.

2. A process as claimed in claim 1 wherein said free radical initiator is an organic peroxide present in an amount of at least 0.001% by weight, with reference to the poly-α-monoolefine, and said dispersion is heated for a period of about 30 minutes to five hours at a temperature of about 60° C. up to the boiling point of said inert hydrocarbon liquid.

3. A process as claimed in claim 2 wherein the amount of said organic peroxide is about 0.01 to 0.1% by weight, with reference to the poly-α-monoolefine.

4. A process as claimed in claim 2 wherein said organic sulfur compound is present in an amount of about 0.1 to 1% by weight, with reference to the poly-α-monoolefine.

5. A process as claimed in claim 2 wherein said organic sulfur compound is stearyl mercaptan.

6. A process as claimed in claim 2 wherein said organic sulfur compound is the amyl ester of mercaptoacetic acid.

7. A process as claimed in claim 2 wherein said organic sulfur compound is the lauryl ester of β-mercaptopropionic acid.

8. A process as claimed in claim 2 wherein said organic sulfur compound is thiophenol.

9. A process as claimed in claim 2 wherein said organic sulfur compound is benzyl mercaptan.

10. A process for improving the stability of a high molecular weight poly-α-monoolefine which comprises dispersing said poly-α-monoolefine as a finely divided powder in an inert hydrocarbon liquid containing at least 0.01% by weight with reference to the poly-α-monoolefine, of an organic sulfur compound having one of the formulae R—SH and HS—$R_1$—$COOR_2$ wherein R represents alkyl of 2 to 18 carbon atoms, cyclohexyl, phenyl, methyl-substituted phenyl, naphthyl and benzyl, $R_1$ represents lower alkylene and $R_2$ represents alkyl of 2 to 18 carbon atoms, heating said dispersion with agitation at a temperature of about 20° C. up to the boiling point of said inert hydrocarbon liquid, under a substantially oxygen-free atmosphere in the presence of UV-rays and for a period of about 30 minutes to one hour; and separating the poly-α-monoolefine from said dispersion.

11. A process as claimed in claim 10 wherein said organic sulfur compound is present in an amount of about 0.1 to 1% by weight, with reference to the poly-α-monoolefine.

12. A process as claimed in claim 10 wherein said organic sulfur compound is stearyl mercaptan.

13. A process as claimed in claim 10 wherein said organic sulfur compound is the amyl ester of mercaptoacetic acid.

14. A process as claimed in claim 10 wherein said organic sulfur compound is the lauryl ester of β-mercapto-propionic acid.

15. A process as claimed in claim 10 wherein said organic sulfur compound is thiophenol.

16. A process as claimed in claim 10 wherein said organic sulfur compound is benzylmercaptan.

17. The process as claimed in claim 2 wherein said poly-α-monoolefine is polypropylene.

18. The process as claimed in claim 10 wherein said poly-α-monoolefine is polypropylene.

19. The stabilized poly-α-monoolefine product obtained by the process of claim 2.

20. The stabilized poly-α-monoolefine product obtained by the process of claim 10.

References Cited

UNITED STATES PATENTS

| | | | |
|---|---|---|---|
| 2,568,902 | 9/1951 | Thompson et al. | 260—94.9 |
| 2,811,514 | 10/1957 | Hagemeyer | 260—94.9 |
| 2,967,848 | 1/1961 | Hawkins | 260—45.7 X |
| 3,144,422 | 8/1964 | Homberg | 260—23 |

DONALD E. CZAJA, *Primary Examiner.*

M. J. WELSH, *Assistant Examiner.*